Aug. 6, 1929.  M. O. TEETOR  1,723,823

PISTON

Filed March 15, 1926  3 Sheets-Sheet 1

Inventor:
Macy O. Teetor
by Rector, Hibben, Davis and Macauley
Attys

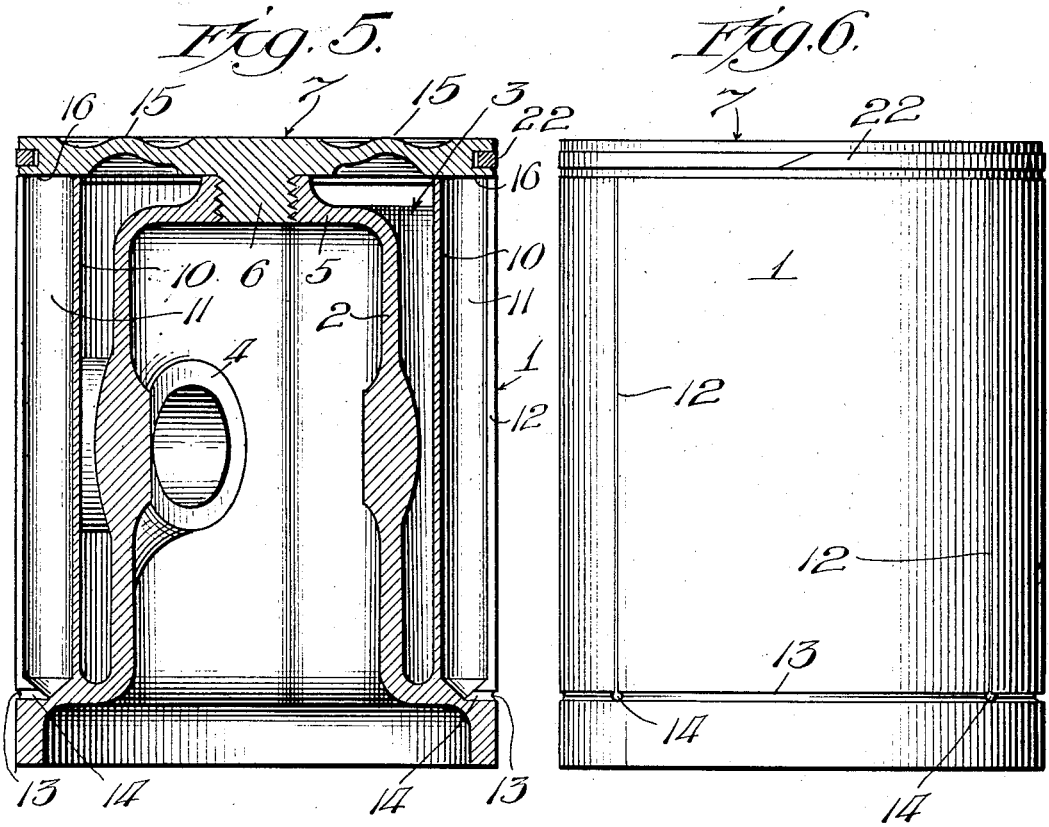
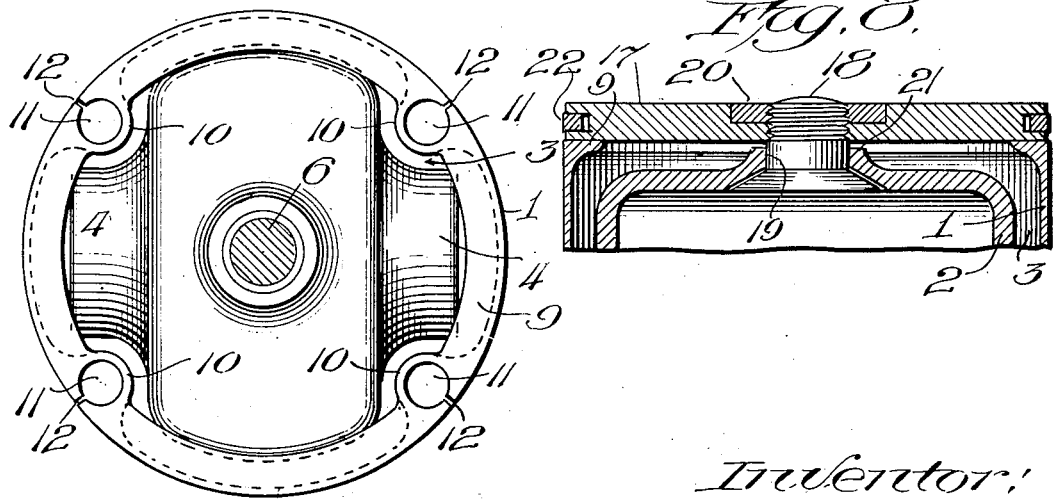

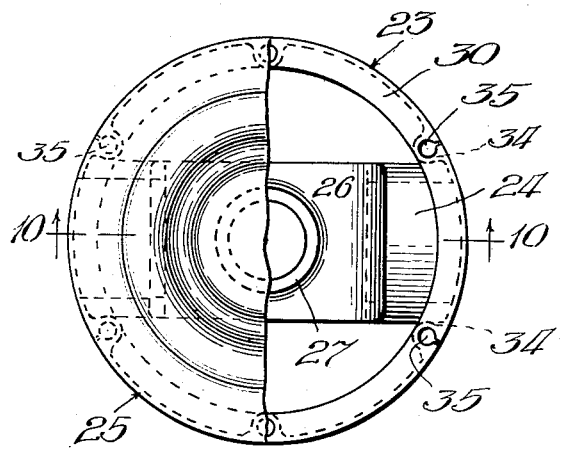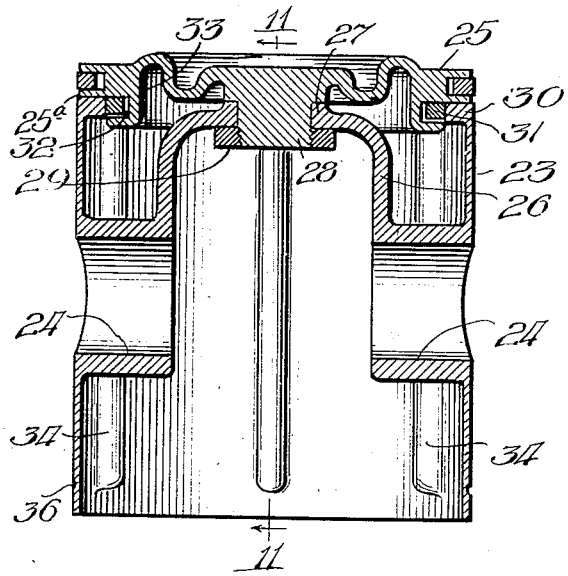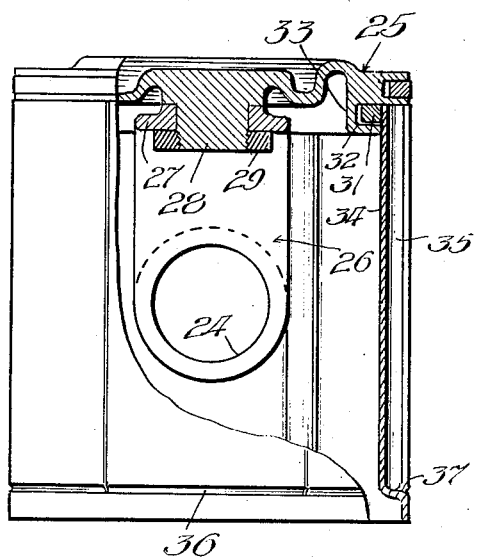

Patented Aug. 6, 1929.

1,723,823

UNITED STATES PATENT OFFICE.

MACY O. TEETOR, OF HAGERSTOWN, INDIANA, ASSIGNOR TO THE PERFECT CIRCLE COMPANY, OF HAGERSTOWN, INDIANA, A CORPORATION OF INDIANA.

PISTON.

Application filed March 15, 1926. Serial No. 94,662.

My invention relates to pistons and, more particularly, to pistons of the sleeve type having ringless bodies which may be used in connection with internal combustion engines.

One of the objects of my invention is to eliminate the use of piston rings in the piston body, at the same time providing for and maintaining a definite sealing relation between the piston body as a whole and the cylinder wall regardless of expansion and contraction, and whereby the friction condition set up between the piston and the cylinder wall is reduced to a minimum, without reducing the efficiency of the seal, with the result that there is less wear of the relatively moving parts.

Another object is to provide a piston with its outer wall slitted so as to permit of expansion and contraction of the same without change in its relation to the cylinder walls, at the same time, preventing communication to the space between the walls through the slits.

Another object is to provide a piston construction wherein the wall thereof adjacent the cylinder wall may be maintained at or near cylinder wall temperature.

A further object is to provide a removable cylinder head which is so mounted as to seat upon the outer wall portion of the piston and so constructed that its seated relation with the piston is maintained regardless of expansion or contraction of the head or body or both.

An additional object is to provide positive means for maintaining a uniformly distributed oil film between the piston and the walls of the cylinder within which it works, this same means serving also as an oil seal to assist in preventing the escape of gases, et cetera, past the piston.

Still another object is to provide a piston which is light and simple in construction, cheap to manufacture and having a minimum of movable parts which reduces upkeep cost.

Other and further objects will become apparent hereinafter and by reference to the appended claims and the drawings wherein;

Figure 5 is a vertical sectional view taken at a point passing through line 5—5 of Fig. 3.

Figure 6 is an elevated view of the piston of the previous figures.

Figure 7 is a horizontal sectional view taken on line 7—7 of Fig. 1.

Figure 8 is a partial sectional view of one modified form of piston construction, taken in substantially the same position as Fig. 2, and showing a reciprocable form of piston head construction.

Figure 9 is a top plan view of another modified form of piston constructed in accordance with my invention, a portion of the head being cut away to show the internal construction thereof.

Figure 10 is a vertical sectional view taken on line 10—10 of Fig. 9.

Figure 11 is an elevated plan view of the piston of Figs. 9 and 10, a portion of the body being cut away and sectioned to show the relative positions of the parts looking in a direction at right angles to the view of Fig. 10 (see line 11—11 of Fig. 10).

Figure 1:
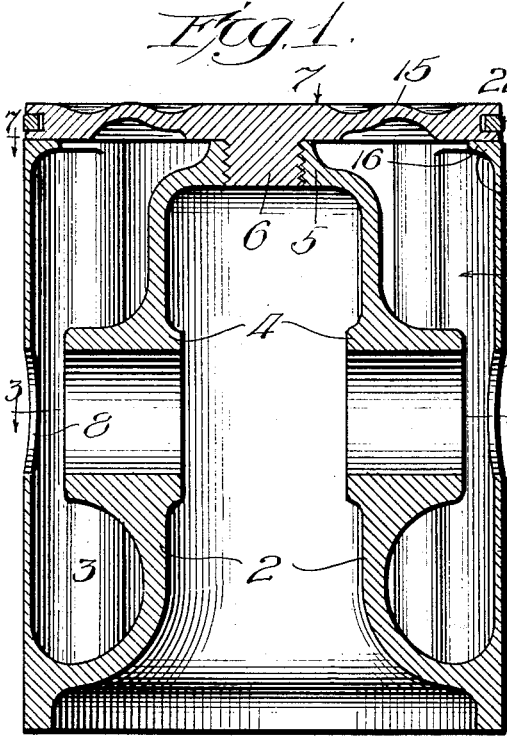
Figure 1 is a vertical sectional view of one form of piston constructed in accordance with my invention.
Figure 2:
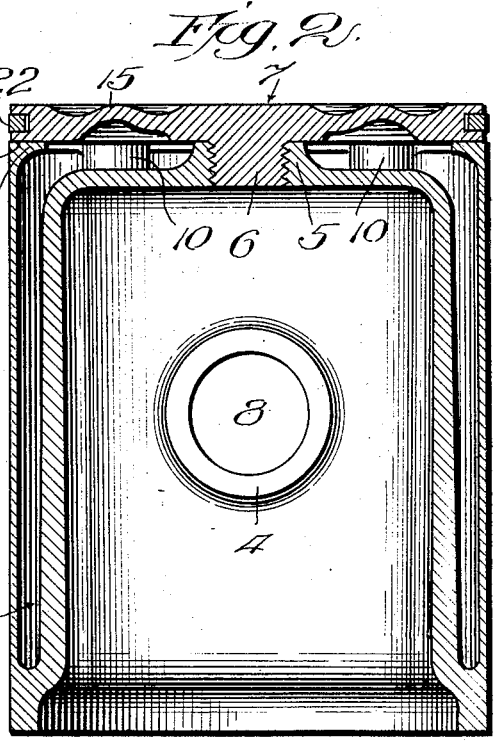
Figure 2 is a vertical sectional view of the piston of Fig. 1 but taken at right angles to the section of Fig. 1.
Figure 3:
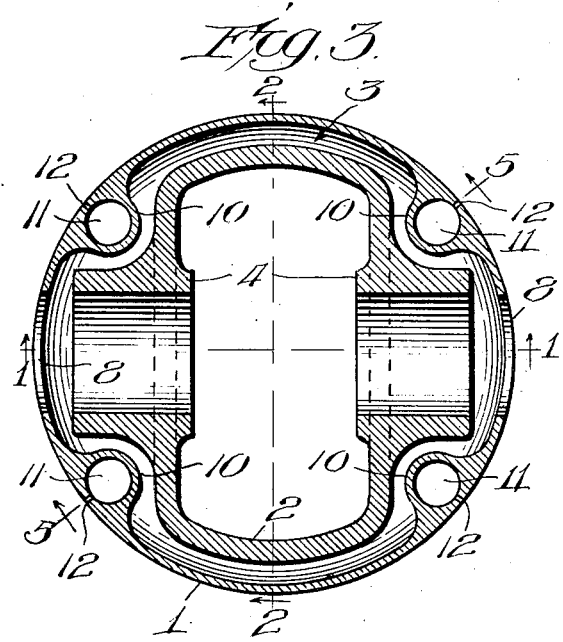
Figure 3 is a horizontal sectional view taken on line 3—3 of Fig. 1.
Figure 4:
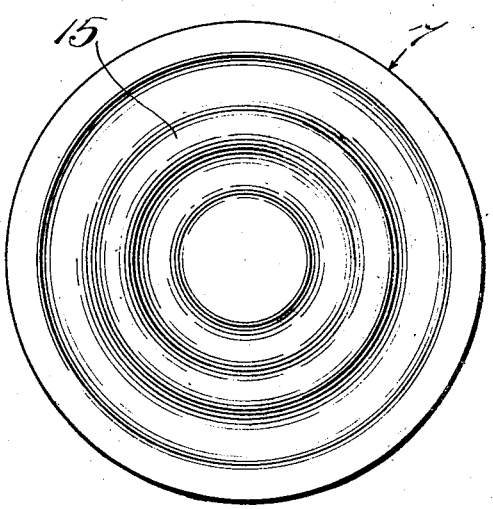
Figure 4 is a top plan view of the piston of Fig. 1.

In Figs. 1 to 7, inclusive, I have shown one form of piston construction in accordance with my present invention, this piston being adapted, particularly, for use in connection with internal combustion engines, although it may be used in other instances. Referring particularly to Figs. 1 to 7, inclusive, my piston may comprise an outer wall 1 and an inner wall 2 formed integral therewith, these two walls extending to the bottom portion of the piston where the piston is cooler and expansion less and being spaced so as to form an irregular U-shaped space 3 therebetween as shown in Figs. 1, 2 and 5. The inner wall 2 is of comparatively rugged construction, being formed with the bosses 4 which are adapted to carry the wrist pin for connecting the connecting rod to the piston. The inner wall is provided at its top with a vertically extending shoulder or boss 5, having a threaded opening therethrough to receive the threaded stud 6 of the removable head 7.

The outer wall of the piston is formed comparatively thin so as to be subject to rapid heat changes whereby it may be maintained at or near substantially the same temperature as the cylinder wall temperature. The outer wall is provided with openings 8 for the ready insertion and mounting of the wrist pin in the bosses 4, it being understood that the wrist pin is not of such length as to extend beyond the outer edges of the bosses 4. The outer wall 1, at its top, is provided with an inwardly extending flange 9 which is adapted to serve as a seating portion upon which the head 7 may seat, as will be explained hereinafter.

The outer wall 1 is of a diameter equal to the diameter of the cylinder in which it works minus oil film clearance. By providing such a relation of these parts, with the film of oil therebetween, the piston is effectively sealed with the cylinder wall so as to prevent the escape of fluid, gases, pressure, and the like, past the same when such active forces may be exerted upon the top of the piston. My piston is adapted normally to the proper clearance for effecting the above condition and such clearance is maintained under all operating conditions. It is obvious that during the operation of the piston in the cylinder the relative metal parts will become heated whereby expansion will take place. Unless some means is otherwise provided, this expansion may become so great as to bring the outer walls of the piston tightly against the cylinder walls, causing excessive friction and heating of the parts with the resultant obvious destructive effects. Therefore, it is desirable to provide against such a condition and I do so, preferably, by providing the outer wall of my piston with a plurality of inwardly extending ribs 10. These ribs 10 extend longitudinally along the outer wall, as shown in Fig. 5, and preferably, have their central portion drilled out to form the space 11 therein. The outer wall is slitted longitudinally into the space 11 as at 12, so that, with the piston operating in the cylinder, as the outer wall becomes heated and expands, the expansion will take place in such a manner and the cylinder will exert such a pressure on the piston wall 1 as to cause a yielding or compression of such wall to cause the opposite edges of the slits 12 to approach each other nearer and nearer dependent upon the degree of expansion; that is, as the outer wall 1 expands, the expansion will be compensated for by the slits, as explained, instead of increasing the outside diameter of the outer wall. It is to be understood that the slits 12 may be of sufficient width to compensate for expansion under maximum working conditions. This compensation action is aided by making the ribs 10 hollow with comparatively thin walls, as shown in the drawings, since this obviously facilitates flexing of the outer wall sections toward each other during the expansion period. Thus, the outer wall of the piston may be formed normally with a diameter equal to the diameter of the cylinder in which it works minus oil film clearance and that same predetermined relation may be maintained so that upon expansion there will not be an increased frictional relation between the piston and the cylinder walls; and whereby the ideal operating condition is maintained constant and the danger of injury to the piston or cylinder or both due to heating and expansion is eliminated. Still further, my piston provides for maximum operating efficiency without the use of the ordinary piston rings.

In the operation of my piston, it is highly desirable that a uniform film of oil be distributed and maintained throughout the entire cylinder wall surface along which the piston moves. I, preferably, provide for the distribution and maintenance of such a film of oil by the use of a circumferential groove 13 located near the bottom of the piston and extending throughout the circumference thereof as shown in Figs. 5 and 6. This groove 13 is so located and of such construction as to be constantly fed with oil from the engine crankcase, or other suitable oil supply, as the piston reciprocates. As the piston moves, the oil carried by the groove 13 is distributed along the cylinder wall, throughout its circumference, in a uniform film, thus effecting and maintaining a uniform seal between the piston and the cylinder wall. Part of the oil on the cylinder wall finds its way through the slits 12 and thence to the bottom of the rib spaces 11. The rib spaces 11 are connected, at their lower end, to the groove 13 by passages 14 so that the oil which finds its way into the ribs spaces 11 finds its way back to the groove 13 for re-distribution, thus providing another constant feed and source of oil supply for the groove 13. The groove 13 is always filled with oil so that, at all times, regardless whether the engine is just being started or has been running for some time, operating slowly or fast, a film of oil will be uniformly distributed and maintained throughout the cylinder wall surface over which the piston operates, thus eliminating under all operating conditions, the possibility of injury to the engine due to lack of cylinder lubrication. The groove 13, always being filled with oil, provides a positive oil seal at its position in the cylinder, and insures the proper sealing condition between the piston and cylinder walls at all times.

The head 7 which is carried by the inner wall 2 is of the disk type, having its surface concentrically ribbed or corrugated as shown at 15, Figs. 1, 2, 4 and 5. The head 7 is free to flex about its point of attachment to the inner wall 2, this flexing being materially aided by the corrugated surface, particularly, since the corrugations permit the disk head to be formed comparatively thin without sacrificing its strength. The under surface 16 of the head 7 near its outer edge is formed so as to assume a gas-tight seated position on the inwardly extending flange portion 9 of the outer wall 1 when pressure is exerted on the top of the head causing it to flex downwardly and press firmly thereagainst. It will be noted that the flanging portion 9 does not extend uniformly throughout the circumference of the outer wall, but is interrupted by the ribs 10. However, the under seat portion 16 of the head 7 is of such width as to seat not only upon the flange seat 9 but also upon and over the top of the ribs 10, as shown in Fig. 5, to form a gas-tight joint at that point also. Another important feature of the corrugated or concentrically ribbed head 7 is that the corrugations permit of expansion of the head 7 toward and away from the cylinder walls without warping of the same. This is a very desirable feature because it may be that, otherwise, the head might tend to warp so that when it would flex toward the outer wall, it would not assume a true seated position thereon, permitting the escape of gases, pressure, etc., past the same into the space 3. Thus, a removable piston head is provided which serves to seal the space 3 at the top thereof against pressure which may pass the head and which would otherwise enter such space and expand or force outwardly the wall 1 against the cylinder walls causing the detrimental effect hereinbefore referred to, all of this being effectively accomplished regardless of expansion of the head or body or both.

Furthermore, by making the piston head 7 ridged or corrugated as shown, more metal is presented to the fire in the cylinder whereby the head will not become heated as quickly as with other pistons. As the head does become heated, this heat is transmitted from the head to the cylinder wall and thence to cooler points and also from the head through the inner wall to the wrist pin and connecting rod and thence to the parts operating in the crank case. The space between the inner wall and outer wall serves as an insulating medium for insulating the outer wall from the inner wall so as to assist in maintaining the outer wall 1 at or near cylinder wall temperature.

In the modified form of piston, as shown in Fig. 8, I provide a reciprocable head instead of a flexing head. This head may also, if desired, be concentrically ridged or corrugated for the purposes just stated in connection with the head 7, although it is not shown as such in this figure. As shown in Fig. 8, the reciprocable head may comprise a disk head portion 17 which is carried by the support screw 18. The support screw 18 is passed through the opening 19 in the top of the inner wall 2 and then screwed into the head 17, being locked in place by the lock nut 20. The support screw 18 is of such shape and dimensions as to move slidably in the opening 19, the upwardly projecting portion 21 of the wall 2 serving as a stop limiting the downward movement of the head 17. With this construction, except possibly on the suction stroke, the head 17 is adapted to seat tightly on the seat portion 9 of the outer wall and the top of the ribs 10 so that, at all times when pressure is present on the top of the head, any pressure that may pass it cannot enter the space 3 via the joint between the head and outer wall.

In both the preferred and modified form of Figs. 1 to 8 inclusive, the head carries a low tension ring 22 which serves as a fire ring. When combustion takes place above the head 7, the fire contacts with and spreads out over the top of the head and, unless otherwise provided against, might pass the edges of the head to the seat formed between the head and outer wall 1. This might result in the burning off of the oil thereon which would destroy the effectiveness of the seal at that point and probably permit some pressure to enter at that point into the space between the inner and outer walls. Also if the ring 22 were not provided the fire which would probably pass the head would probably cause the formation of carbon deposit on the seat 9 and under portion of the head 7 and also tend to destroy the oil film between the upper portion of the outer wall and cylinder wall, with the obvious leakage and destructive results. By adapting the head 7 to carry the fire ring 22, the fire above it is positively prevented from passing the head. This fire ring 22 also serves to decrease the pressure which may tend to flow past the head.

For the purposes of explanation of operation, it will be assumed that the piston shown and described is employed in a four cycle internal combustion engine. The forces acting on the top of the piston during the working, compression and exhaust strokes of the piston may be referred to generally as "pressure". As the piston is moved back and forth in the cylinder on the working (explosion), compression and exhaust strokes of the piston, pressure is applied to or acts directly on the top of the head 7 causing it to flex toward the body and outer wall 1 so as to bring its seat portion 16 into tight seated position on the outer wall flange seat 9 and upon the top of the ribs 10, forming with the outer wall a gas-tight joint, sealed with an oil film, which tends to prevent pressure, etc., from entering the space 3 at that point under all conditions. The outer wall 1, riding in close contact with the cylinder wall, being separated therefrom by a thin film of oil only, provides a positive seal between the parts preventing the escape of gases, pressure, et cetera, from the top of the piston past the same. It is to be understood that the portion of the outer wall 1 above the openings 8 asusmes such a close fitting relation to the cylinder wall, coupled with the oil film therebetween, that a positive seal is formed which prevents the escape of gases, et cetera, past the piston to the openings 8 and space 3. As the piston rides up and down in the cylinder and becomes heated and expands the outer wall retains this same fixed relation with the cylinder wall. The oil groove 13 during reciprocations of the piston replenishes and distributes uniformly a film of oil throughout the cylinder wall surface and insures the desired ideal operating condition.

In Figs. 9, 10 and 11 I have shown a modified form of piston construction, the body being single-walled instead of double-walled. Referring to the piston of Figs. 9, 10 and 11, it may comprise a single-walled body 23 provided with the inwardly extending bosses 24 which carry the wrist pin for connecting the connecting rod to the piston. The body has an outside diameter equal to the diameter of the cylinder in which it works, minus oil film clearance and is adapted to be used without rings.

A flexible and corrugated head 25 is provided for closing the upper end of the piston body, this head being adapted to flex about its support and assume a tight seated relation with the upper portion of the body when pressure is applied to the top of such head. In order to support the head 25 an inverted and open-sided U-shaped member 26 is formed internally of the piston body. This U-shaped support 26 has its arms integrally formed with the inner top portion of the bosses 24 and has its inverted base portion provided with a vertically extending boss 27. The head 25 is fixed to and carried by the support 26 by passing its integrally formed and inwardly extending threaded stud 28 through the boss 27 and locking it in place with the lock nut 29. In this manner the outer portion of the head 25 is free to flex about its inner supported portion to assume a tight seated relation with the top of the body 23 when pressure is applied thereto. The number and depth of the corrugations in the head 25 may be varied, as desired, to suit the particular conditions of use to provide the desirable flexing and warping compensating action hereinbefore explained in connection with the piston of Figs. 1 to 7, inclusive. The arms of the inverted U-shaped support 26 are formed sufficiently thin to permit of flexing of the same to compensate for expansion of the relative parts during operation without disturbing or upsetting the already desirable fixed relations.

The body 23 of the piston of Figs. 9, 10 and 11, like the piston of Figs. 1 to 7, inclusive, is provided at its upper portion with an inwardly extending flange portion 30 upon which the under portion of the head 25 is adapted to seat. In this form of piston construction I provide additional sealing means between the head and flanged seat 30. This additional seal takes the form of an inner ring 31 of the so-called edge pressure type or junk type, this ring having a sealing portion at its upper and outer edges. This ring 31 is mounted in a suitably provided groove 32 in a depending portion 33 of the head 25, this inwardly depending portion being so spaced from the outer edge of the head as to permit of the outer edge of the ring contacting with the inner vertical edge of the flange 30, at the same time, permitting the flanged portion 30 to lie in close proximity to the under seat portion of the head so that such head portion may seat thereon. This ring may be resiliently held in its groove by well known means, such, for example, as springs or other resilient means interposed in the groove behind and at the side of it, or the ring itself may be so formed as to hold the ring in the position stated; or the ring may be formed of a plurality of wedge sections disposed circumferentially in the groove so that a center wedge section in resilient contact with the rear groove wall acts on the side wedges so as to resiliently force them outwardly against the vertically depending edge of the flange 30 and sidewise against the side of the groove. To permit of this arrangement, the upper edge of the groove 32 is aligned and lies in the same horizontal plane with the under seating portion 25$^a$ of the head. The ring 31 may thus be held in its groove 32 so that its upper edge forms a gas or pressure tight seated relation with the upper groove wall and so that, when the head is applied to the body, the outer edge of such ring will lie against the inner vertical edge of the flange 30 and form a gas or pressure tight seated relation thereto. With this construction an additional effective seal is provided between the head and body, this seal being effective to positively prevent the passage of gas, pressure, et cetera, between the head and the flange 30 in any position of such head; that is, a tight seal is effected at the point stated, regardless whether the head is flexed or unflexed.

It is to be noted with this modified form of piston construction, the piston is open from end to end, thus permitting of the circulation of air or other cooling medium throughout the entire length of the piston, at the same time, providing an insulating medium throughout the length of the piston which tends to prevent the transmission of heat from the support member 26 to the upper piston wall.

The piston of Figs. 9, 10 and 11 is also provided with the longitudinally extending ribs 34 extending inwardly from the wall 23. The wall or piston body is slitted longitudinally into the ribs which are formed, preferably, hollow throughout their length to provide the space or chamber 35 therein. This construction, as explained in connection with the other form of piston, serves to maintain the outside diameter of the piston and its relation to the cylinder wall regardless of expansion or contraction during operation. The lower ends of the ribbed spaces 35 are connected to a circumferential groove 36 at the lower portion of the body through slits as shown at 37 in Fig. 11. This groove 36 serves the same purpose as the groove 13 of the piston of Figs. 1 to 7, inclusive.

From the foregoing it is obvious that I have provided a highly efficient piston which has a diameter equal to cylinder diameter minus oil film clearance whereby the escape of gases past the same is prevented without the use of rings and the like. This construction provides for a minimum amount of friction between the piston and the cylinder wall, at the same time, providing for the maintenance of a fixed relation between the piston and cylinder wall regardless of expansion due to changes in the cylinder heat conditions and piston temperature. In this manner, with my invention, there is a minimum wear of the parts, resulting in the prolongation of the life of the piston. It is also obvious that I have provided an effective and positive means for insuring the distribution and maintenance of a uniform oil film between the outer wall of the piston and the cylinder wall whereby the efficient operation of my piston as a whole is facilitated.

I claim:

1. A piston construction comprising a body formed of sections which are expansibly and contractibly carried and a corrugated head therefor adapted to flex relative thereto.

2. A piston construction comprising a body having an outer wall portion and a spaced inner portion integral with said outer wall, and a head detachably carried by said inner portion, said head being so formed that it will flex upon said outer wall to maintain a tight seal between it and such wall.

3. A piston construction comprising an open-ended body having an outer wall portion of the diameter of the cylinder in which it works monus oil film clearance and a spaced inner portion integral with said outer wall, and a flexible head detachably carried by said inner portion adapted to flex upon said outer portion to provide a seal between it and such outer portion, said head being corrugated to permit of expansion and contraction of the same without warping and disturbing the sealing relation between it and said outer portion.

4. A piston construction comprising an open-ended body having an outer wall portion of the diamter of the cylinder in which it works minus oil film clearance and a spaced inner portion integral with said outer wall, and a corrugated head detachably carried by said inner portion and adapted to flex about its inner supported portion to form a gastight seated position upon said outer wall when pressure is applied to the top of such head.

5. A piston construction comprising a body having a wall with an outside diameter equal to diameter of cylinder in which it works minus oil film clearance, a separate flexible and corrugated head, and a support integrally carried interiorly of said wall for supporting said head.

6. A piston construction comprising an open-ended body flanged at its top to form a horizontal seat, a head supporting portion formed internally thereof, and a head carried by said inner portion and having a seating portion, said head being of such construction and so mounted that it flexes toward said body to cause its said seating portion to seal tightly against said body seat when pressure is applied to the top thereof and is maintained in alignment therewith as the head expands and contracts; to provide a gas-tight seal therebetween.

7. In a piston construction, a body, a separate thin concentrically corrugated head therefor adapted to flex thereupon when pressure is applied to the top of the piston, and means for sealing the joint between said body and head during said flexing action.

8. In a piston construction, a body having an outer wall and an inner head support, longitudinal ribs in said wall and extending to the top of said body, said ribs being hollow throughout their length, slots extending through said outer wall and into said rib spaces, and a flexible head carried by said support and adapted to assume a gas-tight seated relation upon the top end of said body and over said rib spaces when pressure is applied to the top of the piston.

9. In a piston construction, a body having its outer portion of an outside diameter equal to the diameter of the cylinder in which it operates and an internally disposed head support, means for maintaining the diameter of said body upon expansion and contraction of the same, and a flexible head carried by said support and detached from said outer body portion and adapted to assume a seated position on said outer portion when pressure is applied to the top of the piston.

10. In a piston having a body of substantially the same diameter as the cylinder in which it operates, means for distributing and maintaining a film of oil throughout the contacting surface of said body during its movement in its cylinder said means including a circumferential series of oil collecting pockets extending to the top of said body and having openings in their bottoms leading to a common circumferential groove.

11. In a piston construction, a body, and a plurality of outwardly opening longitudinal chambers formed in the wall of said body and extending substantially throughout its length, and a circumferential groove in the outer surface of said body adjacent the bottom of said chambers, said groove being in communication with all of said chambers.

12. In a piston construction, a body having its upper portion divided into spaced sections, means for sealing the spaces between said sections and for permitting relative movement of such sections toward and from each other, and a corrugated head carried by said body.

13. In a piston, a body slitted longitudinally, means for preventing communication through said slits to the interior of said body, and a head carried by said body, said head being detached from and adapted to assume a gas-tight seated position on said slitted body portion when pressure is applied to the top of the piston.

14. In a piston construction, a body, a removable head adapted to seat on said body, said head being concentrically corrugated and vertically movable so as to maintain its seated relation with said body regardless of expansion of the head or body.

15. A piston comprising an inner wall, an outer wall, and a flexible head adapted to assume a gas-tight seated position directly upon the outer wall when pressure is applied to top of piston.

16. A piston comprising an inner wall, an outer wall, and a flexible corrugated head with a seating portion carried by said inner wall and adapted to assume a gas-tight seated position directly upon the outer wall when pressure is applied to top of piston.

17. A piston comprising an inner rigid wall, an outer flexible wall integral with said inner wall and extending parallel therewith, and a head carried by said inner wall and extending out over said outer wall, said head being flexible and centrally supported by said inner wall so as to flex upon said outer wall when pressure is applied to top of said piston.

18. A piston comprising an inner wall, an outer wall formed integrally therewith, said walls being joined at their bottom to form a U-shaped space therebetween, a head removably carried by said inner wall and adapted to seat tightly on said outer wall when pressure is exerted on the top thereof for sealing the open end of said space, means for dividing said outer wall into a plurality of spaced sections, and means for preventing admission of fluid or fluid pressure to said U-shaped space through said dividing means.

19. In a piston an inner wall, outer wall, longitudinally disposed hollow ribs formed integral with said outer wall, said outer wall being slitted into space in said ribs, and a continuous circumferential groove in communication with the lower end of each of said rib spaces.

20. In a piston, an outer wall of the diameter of the cylinder in which it works minus oil film clearance, an inner wall, a detachable head carried by said inner wall and movable relative to said outer wall, and a plurality of longitudinal ribs formed integrally with said outer wall and disposed between the said walls, said outer wall being slitted into said ribs for maintaining the diameter of the outer wall upon expansion and contraction of same in the cylinder.

21. In a piston, a body, a separate head having its outer portion adjacent the walls of the cylinder detached from said body and adapted to flex relative thereto, and means including a flange on the body for sealing the joint between said head and body when the head flexes toward and upon the body.

22. In a piston, a body having a diameter equal to the diameter of the cylinder in which it works minus oil film clearance, a separate head having its outer portion adjacent the walls of the cylinder detached from the adjacent portion of said body and adapted to flex toward and from that portion of the body, and sealing surfaces on said head and body for rendering the joint therebetween gas tight regardless of expansion or contraction of the head or body or both.

In testimony whereof, I have subscribed my name.

MACY O. TEETOR.